No. 829,803. PATENTED AUG. 28, 1906.
J. W. ROBB.
COMBINATION SWEEPER AND MOWER.
APPLICATION FILED MAR. 15, 1906.
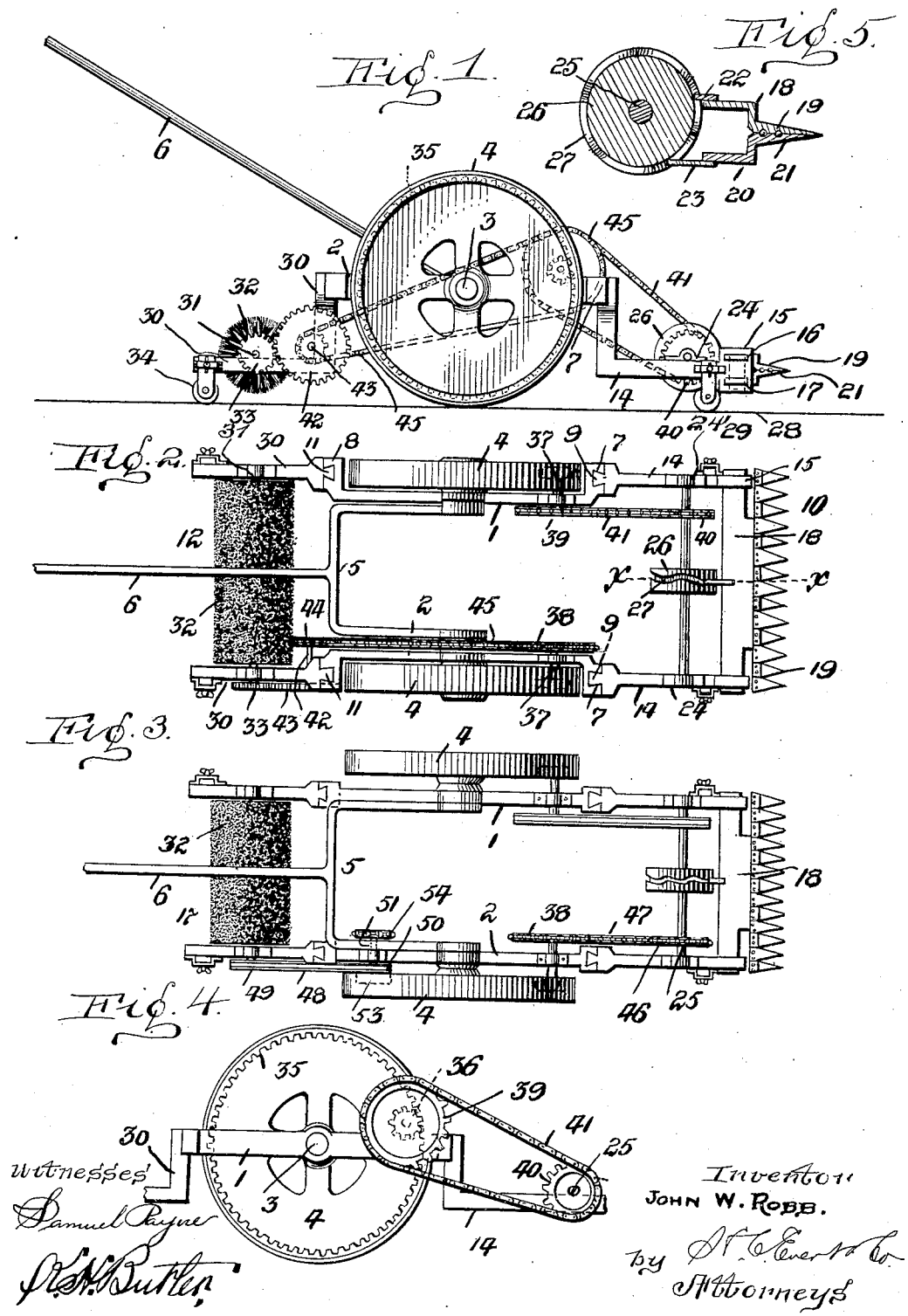
Witnesses
Samuel Payne
J. N. Butler
Inventor
JOHN W. ROBB.
by N. C. Everts Co.
Attorneys
THE NORRIS PETERS CO., WASHINGTON, D. C.

UNITED STATES PATENT OFFICE.

JOHN W. ROBB, OF HARMARVILLE, PENNSYLVANIA.

COMBINATION SWEEPER AND MOWER.

No. 829,803.  Specification of Letters Patent.  Patented Aug. 28, 1906.

Application filed March 15, 1906. Serial No. 306,162.

*To all whom it may concern:*

Be it known that I, JOHN W. ROBB, a citizen of the United States of America, residing at Harmarville, in the county of Allegheny and State of Pennsylvania, have invented certain new and useful Improvements in a Combination Sweeper and Mower, of which the following is a specification, reference being had therein to the accompanying drawings.

This invention relates to certain new and useful improvements in a combination mower and sweeper; and the invention has for its primary object to provide a combination mower and sweeper which can be easily and quickly operated as a combination or the mower and sweeper operated independently.

To this end I have devised a mower embodying reciprocating cutter-bars which are driven from the main supporting-wheels of the implement, and at any desired time a sweeper or rotary brush may be used in connection with the mower by driving the sweeper from the same source of power. In constructing the implement I have arranged the mower and sweeper whereby either one may be detached at any desired time, thus reducing the weight of the implement and permitting of it being easily and quickly manually operated.

The detail construction entering into my invention will be hereinafter more fully described and claimed, and, referring to the drawings accompanying this application, like numerals of reference designate corresponding parts throughout the several views, in which—

Figure 1 is a side elevation of an implement constructed in accordance with my invention. Fig. 2 is a plan of the same. Fig. 3 is a plan of an implement illustrating a slightly-modified form thereof. Fig. 4 is a fragmentary side elevation of the implement. Fig. 5 is a cross-sectional view of a portion of the implement, taken on the line $xx$ of Fig. 1.

To put my invention into practice, I construct my improved implement of two longitudinally-disposed frames 1 and 2, carrying stub-shafts 3 3, upon the outer ends of which are journaled supporting-wheels 4 4. Loosely mounted upon the inner ends of the shafts 3 3 is a stirrup or yoke 5, carrying a suitable handle 6, by which the implement is manually propelled.

The ends of the frames 1 1 are bent outwardly and provided with wedge-shaped sockets 7 7 and 8 8, the sockets 7 7 being adapted to receive wedge-shaped tongues 9 9, carried by a mower-frame 10, while the sockets 8 8 receive similar tongues 11 11, carried by a sweeper-frame 12.

The mower-frame 10 consists of two depending side rails 14 14, the outer ends of which are enlarged, as at 15, and provided with slots 16 16 and 17 17. Between the slots 16 16 is slidably mounted a cutter-bar 18, having a plurality of pointed cutting-blades 19. Slidably mounted in the slots 17 17 is a similar cutter-bar 20, having a plurality of pointed cutting-blades 21, adapted to coincide with the blades 19 of the bar 18, as clearly illustrated in Fig. 5 of the drawings. The cutter-bars 18 and 20, which are similar to an ordinary mower, are provided with rearwardly-extending arms 22 and 23, respectively. The side rails 14 14 are provided with bearings 24 24, in which is journaled a transverse shaft 25. Upon the shaft is mounted a wheel or cam 26, having a peripheral cam-groove 27, which is adapted to impart a reciprocating rectilinear motion to the cutter-bars 18 and 20. The arms 22 and 23 of the bars 18 and 20, respectively, are adapted to engage the cam-groove 27 of the wheel 26 and alternately reciprocate said bars, when a rotary movement is imparted to the shaft 25, as will be presently described.

To support the mower-frame 10, I have provided the enlarged ends 15 15 of the rails 14 14 with hangers 28 28, in which are journaled rollers 29 29, said rollers being adapted to travel over the ground and support the mower-frame when the implement is in operation.

The sweeper-frame 12 comprises two side rails 30 30, similar to the rails 14 14, and upon the rails 30 30 is journaled a shaft 31, carrying a rotary brush 32. The one end of the shaft 31 extends beyond one of the side rails and is provided with a fixed pinion 33, the object of which will presently appear. The sweeper-frame is mounted upon rollers 34 34, similar to the mower-frame.

To impart a rotary movement to the shafts 25 and 31 of the frames 10 and 12, respectively, I provide the inner sides of the wheel 4 4 with circular racks 35, and meshing with the racks are pinions 36 36, mounted upon shafts 37 37, journaled upon the frames 1 and 2. The inner ends of the shafts 37 37 are provided with sprocket-wheels 38 and 39. The shaft 23 of the frame 10 is provided with a sprocket-wheel 40, and passing over said wheel and the wheel 39 is an endless sprocket-chain 41. Upon the rail 30, adjacent to the pinion 33, is journaled a shaft 42, carrying a pinion 43, which meshes with the pinion 33, and a sprocket-wheel 44. Passing over the sprocket-wheel 44 and the wheel 38 is an endless chain 45. It will thus be seen that when the implement is moved across the ground or the like surface a rotary movement will be imparted to the shafts 25 and 31 through the medium of the pinions and sprocket-chains just described and that a reciprocatory movement will be imparted to the cutter-bars, while a rotary movement will be imparted to the brush 32.

In Fig. 3 of the drawings I have illustrated a slight modification wherein the shaft 25 is provided with an extra sprocket-wheel 46, which is driven by a sprocket-chain 47 from the sprocket-wheel 38. In order to accomplish this and at the same time operate the rotary brush 32, it is necessary that the frames 1 and 2 be confined between the wheels 4 4 to permit of a sprocket-chain 48 being used between the frame 2 and one of the wheels 4. The sprocket-chain 48 is adapted to pass over a sprocket-wheel 49, mounted upon the end of the shaft 41, also a sprocket-wheel 50, mounted upon a shaft 51. The shaft 51 is journaled upon the frame 2 and carries a pinion 53 and a sprocket-wheel 54, the pinion 53 meshing with the rack of the wheel 4, while the sprocket-wheel 54 may be used in connection with the sprocket-wheel 46 for driving the shaft 25 when the sprocket-wheel 38 has been broken or damaged.

In some instances the wheels 4 of my improved mower and sweeper may be provided with rubber or resilient tires, whereby when the mower-frame is detached and the implement is being used as a sweeper the wheels will not disfigure any smooth surface, such as a floor, over which it may pass.

I do not care to confine myself to any specific driving mechanism used in connection with the implement for rotating the shafts 25 and 31, and such changes as are permissible by the appended claims may be resorted to without departing from the spirit and scope of the invention.

What I claim, and desire to secure by Letters Patent, is—

1. An implement of the type described embodying frames, wheels journaled upon said frames, a yoke connecting said frames and carrying a handle, a mower-frame detachably carried by said frames, a sweeper-frame detachably carried by said frames, said mower-frame carrying a shaft, and reciprocating cutter-bars, said sweeper-frame carrying a rotary brush, means to impart a reciprocating rectilinear movement to said cutter-bars, and means to rotate said brush, substantially as described.

2. In a lawn-mower, a frame, stub-shafts carried by said frame, and drive-wheels on said stub-shafts, a yoke having its ends mounted on said stub-shafts and carrying a handle, a mower-frame detachably connected to one end of the first-mentioned frame, a sweeper-frame detachably connected to the other end of the first-mentioned frame, a sweeper in said sweeper-frame, a pair of cutter-bars mounted to reciprocate in the mower-frame, a shaft carried by said mower-frame, a cam on said shaft, coacting means carried by the cutter-bars to engage with said cam, and means actuated from the drive-wheels for operating said shaft to reciprocate the cutter-bars.

3. In a lawn-mower, a frame provided with wedge-shaped sockets in its forward ends, stub-shafts carried by said frame, drive-wheels mounted on said stub-shafts, a yoke connected to said stub-shafts, and a handle carried by said yoke, a mower-frame having wedge-shaped tongues to engage in the wedge-shaped sockets of the first-mentioned frame, a pair of cutter-bars mounted to reciprocate in the mower-frame, and means actuated by the drive-wheels for reciprocating the cutter-bars.

4. In a lawn-mower, a frame, drive-wheels supporting said frame, the ends of said frame having sockets, a sweeper-frame detachably engaged in the sockets in one end of the frame, a sweeper carried by said frame, a mower-frame detachably engaged in the sockets at the other end of the frame, a pair of cutter-bars mounted to reciprocate in said mower-frame, and actuating means for the cutter-bars operated from the drive-wheels, substantially as described.

5. In a lawn-mower, a frame carrying stub-shafts, drive-wheels mounted on said shafts, a yoke connected to said stub-shafts and carrying a handle, a sweeper-frame connected to one end of said first-mentioned frame, wheels supporting the outer end of said sweeper-frame, a sweeper carried by said sweeper-frame, a mower-frame connected to the other end of the first-mentioned frame, wheels supporting the outer end of said mower-frame, a pair of superposed cutter-bars mounted to reciprocate in the mower-frame, a shaft journaled in the mower-frame, and carrying a cam, pins carried by the cutter-bars to engage said cam and driving means actuated from the drive-wheel to operate said shaft and reciprocate the cutter-bars.

6. In a lawn-mower, a main frame, drive-wheels supporting the main frame, said main frame comprising parallel side bars provided with sockets in each end, a sweeper-frame having tongues engaging in the sockets in one end of the side bars of said main frame, a sweeper mounted in said sweeper-frame, a mower-frame having tongues engaging the sockets in the other end of the side bars of said main frame, cutter-bars mounted to reciprocate in the outer end of said mower-frame, means for reciprocating the cutter-bars and means for operating the sweeper, both of said means actuated from the drive-wheels.

In testimony whereof I affix my signature in the presence of two witnesses.

JOHN W. ROBB.

Witnesses:
   A. M. WILSON,
   E. E. POTTER.